Figure 3:
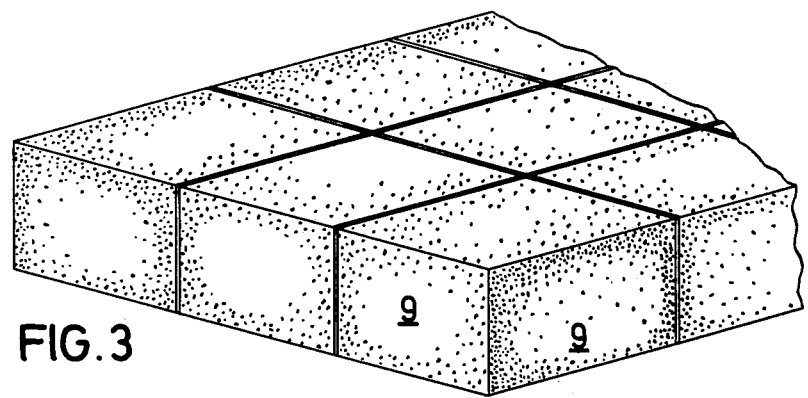

United States Patent [19]

Giesemann

[11] 4,125,664
[45] Nov. 14, 1978

[54] SHAPED ARTICLES OF FOAM PLASTICS

[76] Inventor: Herbert Giesemann, Don Bosco Strasse 3, 5300 Bonn, Germany

[21] Appl. No.: 782,817

[22] Filed: Mar. 30, 1977

Related U.S. Application Data

[63] Continuation of Ser. No. 594,007, Jul. 8, 1975, abandoned.

[30] Foreign Application Priority Data

Jul. 13, 1974 [DE] Fed. Rep. of Germany ....... 2433724

[51] Int. Cl.² ................................................ B32B 3/26
[52] U.S. Cl. .................................. 428/310; 428/311; 428/451; 428/921
[58] Field of Search ............... 428/311, 310, 315, 921, 428/451

[56] References Cited

U.S. PATENT DOCUMENTS

| | | | |
|---|---|---|---|
| 3,194,708 | 7/1965 | Fourcade et al. | 428/311 |
| 3,269,887 | 8/1966 | Windecker | 428/311 |
| 3,451,842 | 6/1969 | Kurz | 428/311 |
| 3,627,622 | 12/1971 | Vega | 428/311 |
| 3,728,206 | 4/1973 | Buese | 428/311 |
| 3,764,365 | 10/1973 | Duncan et al. | 428/425 |
| 4,015,386 | 4/1977 | Cook | 428/921 |
| 4,024,310 | 5/1977 | Wooler et al. | 428/310 |

FOREIGN PATENT DOCUMENTS

1,357,346  6/1974  United Kingdom ..................... 428/311

*Primary Examiner*—William J. Van Balen
*Attorney, Agent, or Firm*—Sprung, Felfe, Horn, Lynch & Kramer

[57] ABSTRACT

Shaped part based on rigid urea formaldehyde or melamine formaldehyde foam of at least partially open cell structure and having density of 5 to 150 kgs/cu.m. The cells of the foam material adjoining the periphery of at least one external surface of the shaped part are impregnated with a silicate, and the external surface is coated with a silicate lacquer which forms a continuous top coat. A reinforcing sheet material is bonded to the top coat. The shaped part is of improved fire proofness, and compressive, tensile, and flexural strength of the foam.

12 Claims, 6 Drawing Figures

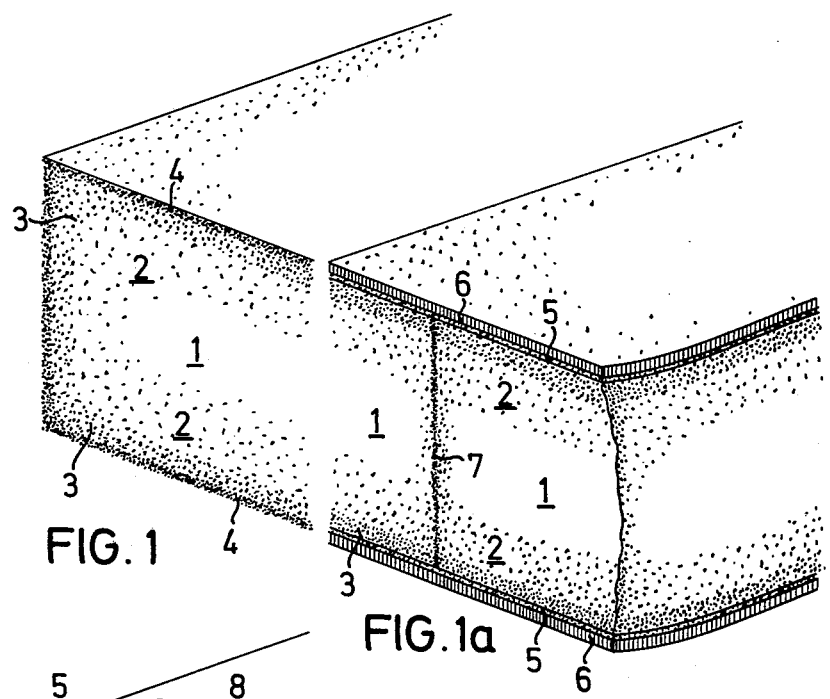
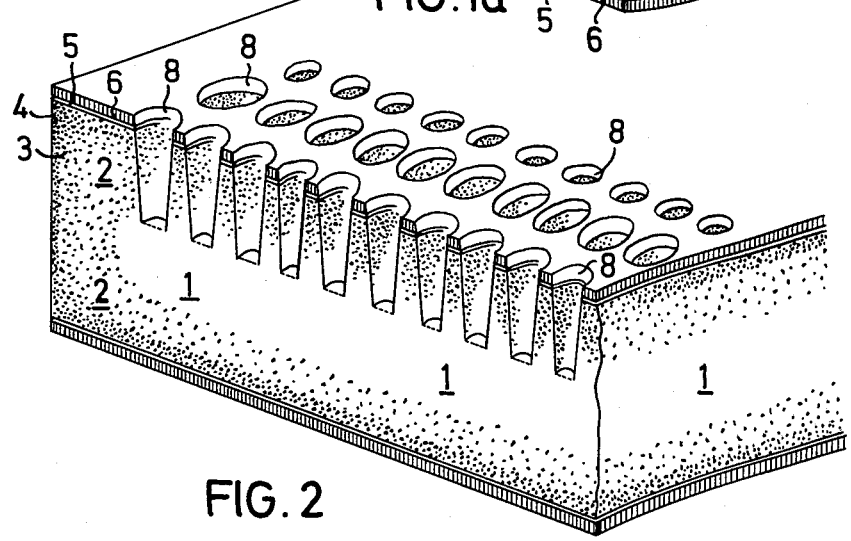

SHAPED ARTICLES OF FOAM PLASTICS

This is a continuation of application Ser. No. 594,007, filed July 8, 1975, mow abandoned.

The present invention relates to shaped articles of foam plastics and processes for producing said articles and more particularly relates to novel light-density shaped articles which may be used as structural members, e.g., as synthetic resin foam boards or panels in the insulation field.

These novel shaped articles of insulating material are obtained by subjecting light-density materials known per se having wholly or partially open-cell foam structure, preferably synthetic resin foam products, to a single-step or multistep deep impregnation with a flowable agent followed by a drying process. Moreover, these shaped articles are coated with a surface lacquer or bonded to a top layer by means of an adhesive, said top layer resting on the article like a film.

Light-density shaped articles according to the invention have the following advantages over untreated foams:

(1) Substantially increased mechanical strengths with little additional expense of stabilizing quantities of materials;
(2) drastically improved non-flammability up to fire proofness;
(3) if necessary or desired, a maximum degree of resistance to diffusion of gas water vapor, and
(4) optimum absorption of ariborne sound by a special aftertreatment by perforation.

Further advantages include increased heat resistance and cold or low temperature resistance, resistance to vibrations and dimensional stability.

These requirements must be generally satisfied for insulation to cold, heat and sound.

It is known from investigations that an optimum of thermal insulation and economy of energy is achieved with a specific gravity of an insulating material having cellular structure of 0.035 to 0.065. Those polystyrene and polyurethane foam boards having these specific gravities which at present are most widely used have sufficient mechanical strengths as self-supporting and also load carrying insulating boards and panels. However, on contact with a flame, they burn vigorously while vigorously emitting thick smoke and dripping. If halogens are incorporated as additives in known manner to improve the burning behavior, formation of open flames is partially reduced, but smothering and dripping remain. Additionally, evolution of more or less corrosive and toxic bromine, chlorine and fluorine gases occurs. Moreover, resistance to diffusion, e.g., in refrigeration, is not adequate and absorption of airborne sound insufficient.

As regards the behavior of plastic materials with respect to flammability and combustibility, it is known that the aminoplast resins, especially the urea-formaldehyde resins and melamine-formaldehyde resins and, to some degree also the phenol-formaldehyde resins are substantially more resistant. However, in contrast to the plastic materials mentioned above, these resins are brittle and rigid.

Although aminoplast resins are said in literature to be "incombustible", it appeared that such a foam which is produced at present with densities of 0.005 to a maximum of 0.020 is briefly set alight at temperatures above about 450° C. with formation of formaldehyde. The blowing agent used in foam production by the latex process also contributes to brief inflammation, especially at low densities. Of course, especially with such low density foams having cellular structure, the oxygen necessary for combustion has particularly ready access to the shaped article being tested. A detailed description of foams made of aminoplasts, i.e., for example, formaldehyde condensation products based on urea, melamine, dicyanodiamide and/or derivatives thereof, are found, for example in Kunststoff-Handbuch, Vol. X, Vieweg-Becker "Duroplaste", Karl Hanser Verlag, Munich, 1968, pp. 135 et seq., especially 466–475, including the bibliography cited therein. Corresponding information on foams of phenoplasts is found, for example, in Ullmann "Encyklopädie der technischen Chemie", 3rd ed., Vol. 15 (1964), pp. 190-1 including the bibliography mentioned therein.

It is an object of this invention to improve light-density materials having an open or at least partially open cellular structure, preferably duroplast synthetic resin foams and more preferably aminoplast resin foams and phenoplast resin foams to an extent such that there are fully useful for practical use in a great number of fields of application, e.g., in the construction field. The invention illustrates materials of this kind and, moreover, relates to the process of producing these improved foams.

The invention relates to a novel foamed shaped article preferably in the form of boards and panels, e.g. for thermal and acoustic insulation, said shaped article being characterized in that the wholly or partially open-cell foam structure or skeleton is impregnated to a great depth in one or a plurality of steps with a reinforcing material hardened in situ at least from one external surface and that the foamed shaped article impregnated in this manner is provided with a surface lacquer and/or is reinforced on at least one external surface with a continuous covering layer consisting, for example, of a metal foil, paper or paper board such as soda kraft paper or asbestos board.

The most important impregnating agents used for the purposes of the invention are water-soluble silicates, especially water glass which, after impregnation of the foamed shaped article, has been hardened in situ by drying. The silicate impregnation is especially present in the outer regions of the foam structure. The surface lacquer applied to the impregnated foamed article is also a flame retardent material. Here again, the silicate top coat which may completely envelop the impregnated foamed shaped article is preferred. If the foamed shaped article is reinforced on at least one external surface with continuous covering layers, it is desirable to use also a flame retardant adhesive for bonding the impregnated foam to the reinforcing sheet material. A particularly suitable adhesive is again a silicate-based material and preferably water glass.

The foamed shaped article may be treated in single-step or multistep processes exclusively with impregnating agents on silicate basis. However, if desired, a mixed impregnation may also be provided, e.g. an impregnation where initially a preimpregnation is effected with an impregnating agent based on a synthetic resin and curing in situ followed by silicate impregnation. Reversion of this order of synthetic resin impregnation and first silicate impregnation is also possible.

The concentration of the impregnating agent in the foam generally decreases from the outside to the interior. The interior of the foam core usually contains regions which are not impregnated.

It has been found surprisingly that this single step or multistep impregnation with a flowable material hardening in situ results in optimum reinforcement even of extremely fragile and brittle foamed shaped articles with a low expense of impregnating material due to the fact that, corresponding to the requirements with respect to inherent stability under the action of forces applied from the outside, the proportion of additional solid increases in an almost linear pattern from the interior to the marginal zones in the same way as nature achieves a maximum of stability with a minimum of matter in a great number of structures and systems such as bones, stalks, trucks, etc. in case of animals and plants. After drying and/or condensation of the impregnating composition, the impregnated foamed shaped article according to the invention constitutes a continuous supporting skeleton in such a manner that loads are borne not only by the original foam structure of the aminoplast resin alone but, in a compound effect, also with the solid introduced by impregnation. If this foamed shaped article impregnated in accordance with the invention is additionally provided at the periphery with a material, preferably one of high tensile strength such as a metal foil or soda kraft paper together with an adhesive, this sandwich combination diverts especially the acting tensile and bending forces in a downright ideal manner dissipatingly into the interior of the foam through the stable marginal zones. Consistent with these inherent and external forces, the media in this compound effect are at the right place in correct form and with sufficient strength.

The foamed shaped articles according to the invention preferably contain as completely or partially open-cell synthetic resin foam an aminoplast foam, especially urea or melamine-formaldehyde resin foams produced by what is known as the latex foaming process. Up to the present, this type of foam could be produced only with densities of 0.005 to 0.020. Due to the brittle and hard macromolekular structure and the relatively low density, these foams have only a low compressive strength of about 0.3 kgs./sq.cm. and no shear strength, tensile strength or flexural strength so that they could previously be used only as a filling material between walls which in themselves are dimensionally stable or in the form of flakes as insulating material between plastic films.

While the behavior with respect to flammability and combustibility was relatively favorable, there was absent any resistance to diffusion.

It has been found that the invention gives particularly favorable results with this foam, but it is additionally applicable to any synthetic resin foam having a more or less open-cell or mixed cell structure, e.g. to brittle or toughrigid plastic foams of phenol-formaldehyde, polyurethane or polyvinyl chloride resins. Flexible open-cell foamed resins may also be used for certain fields of application. However, if these are constantly compressed in use, they are less desirable.

The invention comprises the process for producing the impregnated foamed shaped articles described above. This is achieved by producing in a manner known per se an at least partially open-cell foam body and impregnating this body with the impregnating agents present in a flowable phase and especially impregnants based on silicate, at least in the surface layers of the cell structure. After hardening of the impregnating agent in situ, preferably by a thermal treatment, the impregnated foamed shaped article is, if desired, coated with the surface lacquer and/or connected to the continuous reinforcing layers attached to the outside.

The impregnating agents are preferably used as solutions or suspensions in solvents. A particularly suitable solvent is water which is used especially for the silicate solutions, i.e. sodium and/or potassium water glass. It may also be used as solvent for pre-impregnation (deep impregnation) with water-soluble synthetic resins, especially aminoplast resins. An example of a suitable solution for this purpose is a synthetic resin solution having a solids content of 25 to 35% by weight, penetrating deeply especially in heated state, condensing and drying rapidly and, moreover, neutralizing any acidic catalyst residues which may be present from the production of the foam. This avoids with certainty corrosive effects which may be possible at a later time. Commercially available water glass solutions may be used as such, i.e., with, for example, 37 to 40 Baumé or in diluted state, e.g., in a ratio of 1:1.5.

When carrying out the process of the present invention with multi-stage impregnation, it may be desirable to select the conditions of the particular impregnation stage and especially the concentration and/or temperature of the impregnating solution in such a manner that the increase in the deposited amount of the impregnating composition from the interior to the outside is assisted. For example, it may be desirable in the multi-stage process to use impregnating solutions of increasing concentration. It may further be advantageous to effect individual or all impregnating stages under vacuum and/or at elevated temperatures.

As regards the desired incombustibility, the silicate solution has been found to be optimum. Commercially available sodium water glass solutions of 37 to 40 Baumé may be used as such or diluted, e.g. in a ratio of 1:1.5.

The depth of penetration is dependent upon the impregnating conditions and substantially on the viscosity of the impregnating medium and on the proportion of open cells as well as the sizes of the cells. The flow or fluidity and, consequently, the depth of penetration of the compositions mentioned above may be improved by heating, e.g., to temperatures ranging between 50° and 100° C. The increase in temperature has the additional advantages that the release of the liquid phase, e.g. water, in the subsequent drying process is accelerated and, moreover, the bond of the impregnating agent to the cellular supporting skeleton is improved.

Furthermore, additions of finely divided inorganic materials, e.g. ultrafine quartz powder having particle sizes up to 20 microns, may be of particular advantage for improving the mechanical and/or physical properties, the mechanical strength, the incombustibility or resistance to the action of water or moisture, especially in the upper surface lacquer layer. For deep impregnation of the foamed shaped article, the more inexpensive sodium water glass may be preferred while, for a subsequent impregnation of the superficial regions and/or for the surface lacquer layer, potassium water glas may be used because of its superior hydrophobicity.

The cell size of the foam is situated in the finely cellular range, especially in the range from about 0.01 to 2 mm., it being possible that the microcellular range of about 0.01 to 0.2 mm. is particularly suitable. If highly uniform depth of penetration of the impregnating agent into the foam structure is desired, an as homogeneous and uniform foam structure as is possible is important.

To achieve uniform depth of penetration, the foamed shaped article is immersed as completely as possible. Depending upon the degree to which the cells of the foam are open, the cell size and the viscosity of the impregnating medium, the time of immersion ranges between 2 and 15 seconds. Thereafter the drying process with release of the solvent begins. At room temperature, this takes a few hours. Preferably a drying temperature ranging between 80° and 140° C. is used. In this case, the drying time is 2 to 10 minutes and may, if desired, still be substantially reduced by using additional radio frequency or infrared radiation. When operating with multi-stage impregnation, drying may be effected after each dipping cycle or only after the last dipping cycle.

If the cell structure is more a mixed one or the cells are closed, the immersion process may be accelerated by previously evacuating the foamed shaped article, e.g. to about 20 Torr.

In many cases, it is desirable for the first impregnation or pre-impregnation to use a synthetic resin solution, preferably a solution of an urea-formaldehyde or melamine-formaldehyde resin having a concentration between about 25 and 40%. Here again, it is desirable to heat the solution to a temperature ranging between 40° and 100° C. The shaped article consisting, for example, of aminoplast foam can be impregnated in a particularly advantageous manner if it has an internal temperature of 90° to 140° C. in the drying process and the primary polycondensation and drying process is not yet fully completed. In this case, the impregnating synthetic resin solution co-condenses particularly favorably and uniformly surrounds the foam cell structure. The high temperature effects not only rapid evaporation but particularly complete and stabilizing condensation.

To increase the resistance to diffusion and abrasion resistance and to achieve optimum behavior with respect to flammability and combustibility, it is desirable to apply a surface lacquer, i.e. a compact and continuous top coat. Preferably a silicate solution of high viscosity admixed, if desired, with, for example, 10 to 50% by volume of ultrafine quartz powder or similar inorganic material having a particle size up to about 20 microns and/or ultrafine metal oxides is applied to this end to a thickness of 0.5 to 3 mm. and preferably 1 to 2 mm. Drying is preferably effected as before at an elevated temperature.

If it is desired to improve substantially the mechanical strengths, especially the tensile strength and flexural strength and/or if an absolute barrier to water vapor permeation and gas diffusion is desired, and, finally, if a different appearance is desired to be given to the surface for optical reasons, a top layer, e.g. a metal foil such as an aluminum foil having a thickness of 0.005 to 0.5 mm. or asbestos paper, asbestos board or an asbestos cement board or paper, e.g. soda kraft paper or paper board, is applied to at least one surface of the impregnated shaped foam article and most efficiently to both surfaces of the article with identical or with different materials, it being desirable to soak these cellulosic products previously with silicate solutions to improve the resistance to inflammation and combustion and the strength. The silicate solution which is preferably applied in a highly viscous state by spraying or by doctor knife is outstandingly suited as adhesive between the impregnated foam article and the film or foil. This solution is an ideal and economic adhesive. After having applied the foil, it is desirable to subject the composite structure to pressing, preferably at an elevated temperature ranging between 40° and 140° C. and under a pressure ranging between 0.2 to 1.0 kgs./sq.cm. depending upon the strength of the foamed shaped article and for a period of time of 5 to 120 seconds depending upon the bond strength of the adhesive or upon the foil medium.

Foamed shaped articles having been impregnated in accordance with the invention and coated with the silicate surface lacquer described above perform excellently in flammability tests carried out in a similar manner as, for example, ASTM test methods 84, ASTM E-136, or ASTM 1692 with butane gas flames of 1300° to 1400° C. If such a flame is directed to this surface, uniform expansion or foaming with simultaneous sintering takes place after 2 to 10 seconds, and a kind of silicate foam layer having a thickness of 5 to 20 mm. is formed, this layer stabilizing itself firmly after this process and, due to this nub-like blister structure, effectively suppressing conduction of heat to the impregnated foamed shaped article. Contacting with the flame can be continued to more than 600 seconds. No alteration is observed and the shaped article remains completely dimensionally stable and free from heat distortion. There is not the least formation of thick smoke and no dripping and, above all, no toxic gases and no odor of formaldehyde are evolved. The foamed shaped article shows exactly the same behavior in a fire as an inorganic material.

If the impregnated foam board is to be used as an airborne sound absorption board, cylindrical or rectangular holes are provided according to the invention at one surface in such a manner that the holes extend to the open-cell zones in the interior of the board which have not been impregnated. Airborne acoustic waves impinging on the board are dissipated by the holes which are preferably closely spaced apart and are absorbed with energy dissipation in the open cell regions of the foamed shaped article.

If it is desired to reduce the drying and condensation time of the freshly extruded shaped foam article in the drying chamber, it is possible to provide the article with very fine bores having diameters in the range of, for example, 0.2 to 1.5 mm. or, in a similar manner, with cuts having a draining action but, in connection with gripping devices, may be advantageous from the process engineering point of view for the transportation and immersion of the foam articles. The flowable impregnating compositions penetrate more readily and vigorously through these openings thereby giving rise to increased strength within the foam structure.

In a particular embodiment, it is contemplated by the invention to provide standardized foamed shaped articles with the impregnating agent and, if desired, with a surface lacquer and, at a later time, assemble these standardized foamed shaped articles adhesively to form larger units such as boards and/or blocks. Here again, silicate solutions are used as particularly suitable adhesives. For example, standardized foamed shaped articles having a size of, for example 50/50/50 to 100/100/50 mm. may be impregnated as such and, if desired, coated with a layer of surface lacquer. Depending upon the size desired of the structural member, these standard pieces are then assembled by spraying them with a silicate solution. The assembled structural member may then be reinforced on at least one external surface with a continuous sheet material, e.g. metal, wood, paper, paper board and the like. Due to the bulkhead or compartment structure, there is obtained in this manner, especially in statical respect and from the fire protection point of view, an ideal sandwich element, especially in cases where the latter consists of two, three or more layers. The size of the standard part is specifically adapted to the production conditions and/or to the properties desired of the finished product. The size of the standard parts may especially be larger than the dimensions mentioned above.

Aminoplast foams are particularly preferred as the base material. In the form of boards, they are self-supporting and may also be used in load carrying services. Similarly, phenol-formaldehye foams which are also brittle-rigid and, due to the foaming process, have a more mixed cell structure can be treated in accordance with the invention. Surprisingly, polyurethane foam bodies have also been found to be suitable. As is known, polyurethanes burn while emitting thick smoke and dripping when contacted with a flame. Even halogen additives hardly bring about an improvement. However, after impregnation according to the invention, if desired by the vacuum process, with silicate solutions and an upper silicate surface layer, there is no inflammation, no smothering or dripping and no evolution of gases at all and the material remains dimensionally stable. By the impregnation, the silicates interlock and mortise themselves into the depth of the foam structure.

Light-density foams having an at least partially open-cell structure and densities within the range of about 5 to 150 kgs./cu.m. and preferably about 20 to 80 kgs./cu.m. are particularly suitable base foam materials for the purposes of the invention. For example, densities of the base foam material within the range from 10 to 120 kgs./cu.m. and preferably 35 to 80 kgs./cu.m. are suitable. It may further be preferred, especially when using the aminoplast foams mentioned above as the base material, to effect the impregnation according to the invention shortly after the production of the base foam. Thus, it may be desirable to carry out the impregnation at least with the first impregnating solution before about 10 hours have expired and preferably within about 1 to 4 hours after the foaming of the base material. Moreover, it may be advantageous to subject the impregnated foamed shaped article to a final thermal aftertreatment by which temperatures within the range from 80° to 160° C. are adjusted at least in the surface layers of the material.

Examples of shaped articles according to the invention in the form of boards are diagrammatically illustrated in FIGS. 1 to 5 of the drawings attached hereto.

FIGS. 1 and 1a show perspectively a section through a board-shaped foam member 1 which contains no or substantially no substantial amounts of impregnating composition in its non-dotted core. The concentration of impregnating composition increases in the direction from the interior to the outside. The region 2 is, for example, soaked with a synthetic resin cured in situ by the first impregnation or pre-impregnation. The region 3 following towards the outside has been impregnated in the second impregnating stage with additional impregnating composition, e.g. with a silicate. In the outer layers of the shaped foam article and passing over into a surface lacquer layer, incorporation and application of impregnating composition in the third process stage is represented. FIG. 1a shows a modification of the foamed base block 1 represented in FIG. 1, this modification being an opening 7 extending throughout the foam block and having been filled with impregnating composition in the impregnating stages in such a manner that a support consisting of impregnating composition hardened in situ extends through the shaped article from one side to the other. Moreover, the continuous reinforcing layers 6 of sheet material are applied to the external surfaces of the impregnated foam material by means of the thin intermediate adhesive layer 5 and strongly bonded to the foam.

FIG. 2 also is a perspective and diagrammatical view of a shaped foam article 1 corresponding to that shown in FIG. 1a with its impregnation 2, 3, 4 increasing in intensity from the interior to the outside and with the reinforcing sheet materials 6 adhering continuously with high bond strength through the intermediate adhesive layer. Openings 8 extending to the non-impregnated core of the foam article 1 are cut into one face of this foamed shaped article. The openings shown in the drawing in regular arrangement and circular form may have any shape and arrangement and serve especially the absorption of sound.

Figure 4:
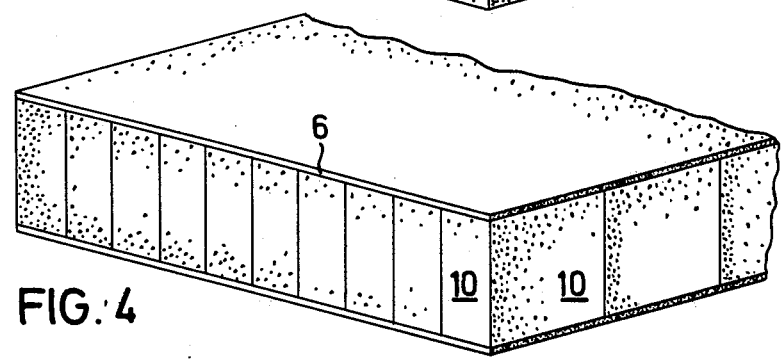
Figure 5:
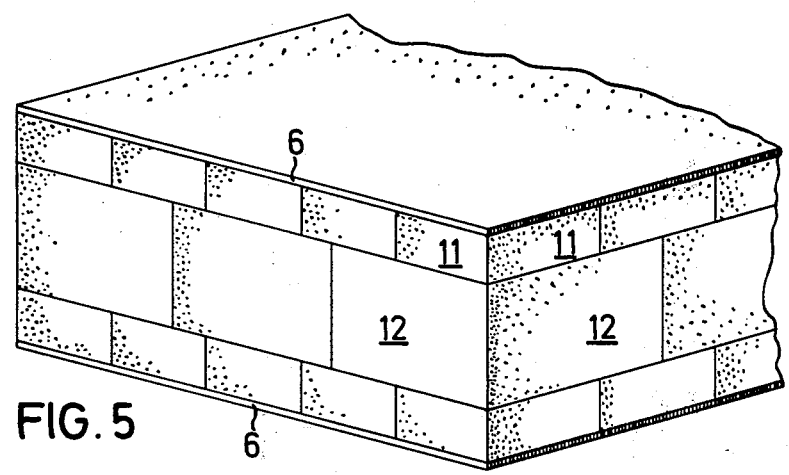

FIGS. 3 to 5 represent the particularly important embodiment of assembling standardized foam parts 9, 10, 11, and 12 after impregnation to form a larger structural member which is reinforced in bulkhead-like or compartment-like manner, In FIG. 3, the standardized and separately produced and impregnated foam members 9 are connected at their narrow faces to form a larger sheet-like structural member. FIG. 4 illustrates the assemblage of standardized, separately produced and impregnated shaped articles 10 through the broad and longitudinal sides to form a board which is then covered with, and strongly bonded to, the reinforcing sheet material 6 on both sides.

Finally, FIG. 5 illustrates the use of separately produced and impregnated standardized shaped articles 11 and 12 of different sizes, these articles being joined and assembled in cross bracing to form a board which is covered on both sides with the continuous reinforcing layers 6.

The examples which follow illustrate the impregnation of foams, these examples being followed by an analysis of these examples and a summary of the results obtained in tabular form.

EXAMPLE 1

A urea-formaldehyde resin foam was produced in a manner known per se by the latex foam process and filled into a mold of 300 × 200 × 100 mm. in size. The polycondensation started after about 30 seconds. The foam solidified at room temperature. After 20 minutes, a test specimen having a size of 200 × 200 × 50 mm. is cut or sawed out by means of a finely serrated saw or a knife and placed into a drying cabinet with gentle air motion and at a temperature of 120° C. After 120 minutes in the drying cabinet, polycondensation and the drying process are substantially completed. The specific gravity is found to be 0.034 and the pH 3.8. The shaped foam part is then rapidly and completely immersed into an aqueous 25% urea-formaldehyde resin solution having a temperature of 90° C. To determine exactly the depth of impregnation, a pulverulent coloring material giving an intense red color is added to this resin solution. After an impregnating time of 5 seconds, the shaped part is placed into the drying cabinet of 120° C. where it is left for 15 minutes until condensation and drying are completed. Thereafter the shaped part is sawed through in the middle. It is found that the impregnated zone which is clearly marked by a reddish color has penetrated on all sides to a depth between 16 and 18 mm. The average density is found to be 0.042. The pH in the marginal zones impregnated to a depth between 18 and 22 mm. ranges between 6.3 and 6.8.

EXAMPLE 2

An urea foam block of 200×200×50 mm is produced and dried as described in Example 1. After a polycondensation and drying period of 140 minutes, the shaped part is also immersed rapidly for 5 seconds into a sodium water glass solution having been prepared from water glass of 37° to 40° Baumé by dilution with water in a ratio of 1:1.5 and heated to 80° C. The shaped part is then immediately placed into the drying cabinet having a temperature of 130° C. and dried. This procedure is completed after 15 minutes. After the block has been sawed through, it is found that the water glass solution which previously had a light blue color has penetrated on all sides to a depth of between 9 and 12 mm. and, in the narrow marginal zones and at the edges even to a depth of 15 mm. The average specific gravity is 0.048 and the pH of the marginal zones 7.2.

EXAMPLE 3

A shaped part of urea foam is produced as described in Example 1 and, after removal from the drying cabinet, immediately immersed into a blue colored impregnating solution prepared from potassium water glass of 28/30°Bé by dilution with water in a ratio of 1:1.0 and heated to 80° C. The foam was impregnated for 10 seconds and thereafter dried for 15 minutes at 130° C. The visible dpeth of penetration is 5 to 8 mm. and the specific gravity 0.057.

EXAMPLE 4

The foam part was treated and dried as described in Example 2. A potassium water glass solution of 28/30°Bé is mixed with ultrafine quartz powder having a particle size of 0 to 20 μm and the mixture heated as a suspension to a temperature of 80° C. The shaped article is immersed for 15 minutes into this aqueous solution and thereafter dried for 15 minutes in the drying cabinet at 90° C. The depth of penetration ranges between 0.5 and 2 mm. and the coating thickness between 0.5 and 1 mm. on an average.

EXAMPLE 5

A shaped part of foam was prepared as described in Example 3. Thereafter, silicate solutions ($Na_2O$) of 43.4 Bé having a viscosity of 240 cps. at 20° C. and previously heated to 60° C. are applied by brush as a thick layer to the two 200×200 mm. surfaces. The shaped part is covered on both sides with two aluminum foils of 200×200×0.5 mm. and placed with both sides into a press. A pressure of 0.5 kgs./sq.cm. at 90° C. is exerted on the shaped part by the press for 10 minutes.

EXAMPLE 6

A shaped part of foam was prepared by the procedure described in Example 3. At the same time, soda kraft paper having a weight of 90 g./sq.m. was immersed in two steps into potassium water glass solutions ($K_2O$) of 28/30 Bé and dried after each immersion in the drying cabinet for 10 minutes at 90° C. A continuous coating of a potassium water glass solution of 28/30 Bé previously heated to 60° C. was applied by brush to the two 200×200 mm. surfaces of the shaped part. Then the soda kraft paper sheets having been treated in the manner described above and cut to a size of 200×200 mm. were placed on the brushed surfaces and pressed for 10 minutes at the same temperature and under the same pressure as in Example 10.

EXAMPLE 7

A shaped part of foam was prepared and impregnated with silicate as described in Example 2, thereafter immersed in the silicate solution having suspended therein ultrafine quartz powder and dried as described in Example 4, thereafter coated again by brush on all sides with the same silicate solution and dried again.

EXAMPLE 8

A shaped part of foam having a size of 200×200×80 mm. was prepared by the procedure of Example 3 and covered on both major surfaces with an aluminum foil having a thickness of 0.2 mm. by the procedure of Example 5. Thereafter, bores having the shape and arrangement shown in FIG. 2 were drilled on one side of the impregnated foam parts by means of a special drill to a depth of 30 mm.

EXAMPLE 9

A shaped part of phenol-formaldehyde resin foamed with n-pentane in a manner known per se (brittle-rigid) and having a specific gravity of 0,45 and a mixed-cell structure is treated and dried according to the invention as described in Example 4.

EXAMPLE 10

A shaped part of polyurethane foam prepared in a manner known per se and having a density of 0.050 and a mixed-cell tough-rigid structure is impregnated and treated in accordance with the invention as described in Example 4.

Test results of the shaped foam parts treated according to the invention and prepared according to Examples 1 to 10

| Kind of test: | Example: | 1 | 2 | 3 | 4 | 5 | 6 | 7 | 8 | 9 | 10 |
|---|---|---|---|---|---|---|---|---|---|---|---|
| Mechanical strengths according to DIN | | | | | | | | | | | |
| Compressive strength DIN 53421 kg/cm.$^2$ | | 3.81 | 2.93 | 4.73 | 6.34 | 5.92 | 6.22 | 5.83 | 5.92 | 5.43 | 6.92 |
| Tensile strength | | 3.87 | 2.84 | 4.12 | 4.32 | 9.87 | 12.11 | 5.92 | 11.2 | 4.34 | 5.21 |
| Shear strength | | 4.32 | 3.85 | 4.88 | 5.78 | 8.82 | 8.93 | 5.87 | 8.32 | 4.89 | 5.88 |
| Flexural strength | | 4.76 | 3.74 | 5.68 | 6.22 | 14.23 | 14.89 | 7.82 | 12.42 | 5.12 | 6.83 |
| Resistance to vibration | | —very good, completely vibration proof— | | | | | | | | | |
| Thermal behavior | | | | | | | | | | | |
| Heat-transfer coefficient λ kcal/mh° C. | | 0.029 | 0.028 | 0.027 | 0.026 | 0.027 | 0.027 | 0.028 | 0.028 | 0.029 | 0.023 |
| Long time heat resistance to ° C. | | 230 | 400 | 500 | 800 | 800 | 800 | 800 | 800 | 240 | 250 |
| Long time cold resistance to ° C. | | 200 | 200 | 200 | 200 | 200 | 200 | 200 | 200 | 200 | 100 |
| Dimensional stability | | —very good, perfectly dimensionally stable— | | | | | | | | | |
| Burning behavior | | | | | | | | | | | |
| ASTM D 1692 Flammability cl. I-VI | | —no inflammation, best class VI— | | | | | | | | | |
| Smothering 1–4 | | —no smothering, best class 4— | | | | | | | | | |
| Dripping 1–4 | | —no dripping, best class 4— | | | | | | | | | |
| Gas evolution 1–4 | | cl.3 cl.4 no evolution of gas or odor, no toxicity— | | | | | | | | | |

-continued

Test results of the shaped foam parts treated according to the invention and prepared according to Examples 1 to 10

| Kind of test: | Example: | 1 | 2 | 3 | 4 | 5 | 6 | 7 | 8 | 9 | 10 |
|---|---|---|---|---|---|---|---|---|---|---|---|
| ASTM 136 | Flammability | | | | | —no inflammation— | | | | | |
| | Afterglowing | | | | | —no afterglowing— | | | | | |
| | Increase in temperature °C | 12° | 10° | 9° | 7° | 7° | 7° | 7° | 8° | 9° | 9° |
| ASTM E 84 | Flammability | | | | | —no inflammation— | | | | | |
| | Smothering | | | | | —no smothering— | | | | | |
| | Evolution of heat | | | | | —no evolution of heat— | | | | | |
| Resistance to diffusion | | | | | | | | | | | |
| Water vapor absorption in % after storage for 24 days | 65% humidity | 0.13 | 0.03 | 0.008 | 0 | 0 | 0 | 0 | 0.007 | 0.08 | 0.007 |
| | 95% humidity | 0.39 | 0.08 | 0.013 | 0 | 0 | 0 | 0 | 0.012 | 0.32 | 0.056 |
| Gas diffusion resistance ml/m.²hr.atm. | | | | | | —particularly high— | | | | | |
| Diffusion resistance factor | | 60 | 80 | 110 | 250 | 1000 | 1000 | 1000 | 400 | 300 | 400 |
| Airborne sound absorption DIN 52212 | | | | | | | | | | | |
| Frequencies | 500 cps. | | | | | | | | 0.59 | | |
| | 1,000 cps. | | | | | | | | 0.48 | | |
| | 2,500 cps. | | | | | | | | 0.65 | | |
| | 4,000 cps. | | | | | | | | 0.69 | | |
| | 6,000 cps. | | | | | | | | 0.73 | | |

What is claimed is:

1. Shaped part comprising a rigid foam of a material of the group urea formaldehyde and melamine formaldehyde, which material is at least partially of open cell structure and has a density of 5 to 150 kgs/cu.m., the cells of the foam material adjoining the periphery of at least one external surface of the shaped part being impregnated with a silicate, said external surface being coated with a silicate lacquer which forms a continuous top coat, and a reinforcing sheet material bonded to the top coat, said impregnating silicate, top coat, and reinforcing sheet material improving fire proofness, and compressive, tensile, and flexural strength of the foam.

2. Shaped part of claim 1, said density being 20 to 80 kgs/cu.m.

3. Shaped part of claim 1, said density being 10 to 120 kgs/cu.m.

4. Shaped part of claim 1, said density being 35 to 80 kgs/cu.m.

5. Shaped part of claim 1, the cell size of the foam being in the range of about 0.01 to 2 mm.

6. Shaped article of claim 1, the impregnation being performed by impregnating the condensed and dried foam with a solution or suspension of the silicate, and hardening the silicate in situ.

7. Shaped article of claim 6, said hardening in situ being by heating to 80° to 160° C.

8. Shaped article of claim 1, wherein the silicate lacquer top coat is an adhesive bonding the reinforcing sheet material to the top coat.

9. Shaped foam part according to claim 1, characterized in that it contains the silicate impregnation above a synthetic resin coating incorporated into the foam by pre-impregnation, said synthetic resin pre-impregnation consisting of a synthetic resin cured within the foam.

10. Shaped foam part according to claim 1, characterized in that the concentration of the impregnating agent decreases from the external surfaces of the shaped part towards its interior.

11. Shaped foam part according to claim 1, characterized in that supports consisting of the impregnating material and connecting at least two surfaces extend through said shaped part.

12. Shaped foam part, characterized in that it is formed by a compound arrangement of a plurality of silicate-impregnated basic shaped parts of foam according to claim 1 and exhibits a bulkhead or compartment structure consisting of flame-resistant silicate-impregnated layers.

* * * * *